US006903523B2

(12) United States Patent
Peterson

(10) Patent No.: US 6,903,523 B2
(45) Date of Patent: Jun. 7, 2005

(54) METHODS AND APPARATUS FOR DYNAMICALLY RECONFIGURING A PULSE WIDTH MODULATION APPROACH

(76) Inventor: William A. Peterson, 2629 Pinabluff Dr., Vestal, NY (US) 13850

( * ) Notice: Subject to any disclaimer, the term of this patent is extended or adjusted under 35 U.S.C. 154(b) by 105 days.

(21) Appl. No.: 10/454,019

(22) Filed: Jun. 4, 2003

(65) Prior Publication Data

US 2004/0245953 A1 Dec. 9, 2004

(51) Int. Cl.[7] ............................................... H02P 1/18
(52) U.S. Cl. ....................... 318/138; 318/439; 318/254; 318/599; 318/811
(58) Field of Search ................................ 318/138, 439, 318/254, 599, 811, 432–434

(56) References Cited

U.S. PATENT DOCUMENTS

| | | | | |
|---|---|---|---|---|
| 3,525,883 A | * | 8/1970 | Iordanidis | 327/423 |
| 4,581,565 A | * | 4/1986 | Van Pelt et al. | 318/294 |
| 4,631,458 A | * | 12/1986 | Furuichi | 318/254 |
| 4,782,544 A | * | 11/1988 | Nystuen et al. | 8/159 |
| 4,959,797 A | * | 9/1990 | McIntosh | 700/275 |
| 5,382,890 A | * | 1/1995 | Moh et al. | 318/254 |
| 5,689,162 A | * | 11/1997 | Li | 318/599 |
| 5,831,403 A | * | 11/1998 | Kanki et al. | 318/286 |

OTHER PUBLICATIONS

UNITRODE Brushless DC Motor Controller, Nov. 1999, pp. 1–14.
John De Fiore, Using the ML4425/ML4426 BLDC Motor Controllers, Fairchild Semiconductor Application Note 42004, Oct. 25, 2000, pp. 1–15.
FAIRCHILD Semiconductor ML4425, Sensorless BLDC Motor Controller, Jul. 2, 2001, pp. 1–16.
ML4425 Sensorless BLDC Motor Controller, Fairchild Semiconductor, Jul. 2, 2001.
John DeFiore, Application Note 42004, Using The ML4425/ML4426 BLDC Motor Controllers, Fairchild Semiconductor, Oct. 25, 2000.
Unitrode Brushless DC Motor Controller, Nov., 1999.

* cited by examiner

*Primary Examiner*—Rina Duda
(74) *Attorney, Agent, or Firm*—Kaplan & Gilman, LLP

(57) ABSTRACT

An apparatus includes a driver circuit including electronic switches operable to deliver voltage and current to a polyphase motor; and a control circuit operable to provide driver control signals to the driver circuit to commutate the electronic switches, the control circuit (i) producing the driver control signals using a first pulse width modulation (PWM) mode when the polyphase motor produces a substantially non-zero acceleration torque; and (ii) producing the driver control signals using a second PWM mode when the polyphase motor produces a substantially zero acceleration torque.

34 Claims, 7 Drawing Sheets

METHODS AND APPARATUS FOR DYNAMICALLY RECONFIGURING A PULSE WIDTH MODULATION APPROACH

BACKGROUND OF THE INVENTION

The present invention relates to methods and apparatus for dynamically reconfiguring a pulse width modulation (PWM) approach for controlling an inverter driving a polyphase motor.

Polyphase motors, such as permanent magnet, synchronous machines must be driven such that the windings thereof are energized as a function of the rotor position in order to obtain a driving torque from the machine. The windings of the polyphase motor are typically driven utilizing an inverter driver that receives a direct current (DC) source of voltage and that produces an alternating current (AC) source of voltage for driving the polyphase motor.

In a three phase motor, the inverter driver circuit will typically utilize a six step commutation technique to ensure that the proper windings are energized as a function of the rotor position. The inverter driver circuit will also ensure that the proper levels of voltage and current are provided to the polyphase motor within a given step of the six step commutation sequence. This may be accomplished using a PWM method to chop the DC source voltage and regulate the current delivered to the windings of the polyphase motor. One PWM method that has gained wide use is the so-called chop-chop method, which may also be called the fast decay method. Another PWM method is called the chop-coast method, which may also be referred to as the slow decay method.

The chop-chop PWM method permits the polyphase motor to be controlled in all four quadrants of the torque versus speed curve. In other words, the chop-chop PWM method permits the polyphase motor to generate power, such as may be useful in regenerative breaking, returning power to the DC source, or both. Thus, the chop-chop PWM method is also sometimes referred to as a four quadrant control.

The chop-coast PWM does not permit the polyphase motor to generate power; indeed, it permits the polyphase motor to operate only in the first and/or third quadrant of the torque versus speed curve. The chop-coast PWM method has certain advantages, such as significantly reduced switching losses in the inverter driver circuit, reduced high frequency components of current in the motor windings, and reduced high frequency components of current in the DC source. The fact that the chop-coast PWM method operates only in the first or third quadrants of the torque versus speed curve creates some problems. The chop-coast PWM method does not permit the measurement of the motor current at all times with a single current sensor measuring current from the DC source. Thus, it is very difficult to control the motor current by measuring the current from the DC source while also achieving a wide bandwidth control. Another problem with the chop-coast PWM method arises when a sensorless commutation scheme is employed to monitor the rotor position of the polyphase motor. Sensorless commutation schemes measure the back electromotive force (BEMF) in order to monitor the rotor position of the polyphase motor. If rotor synchronization is lost while utilizing the chop-coast PWM method, unintended regeneration of power due to the polyphase motor inertia is fed back to the DC source, which is highly undesirable.

In order to avoid the undesirable problems associated with the chop-coast PWM method, designers have employed the chop-chop PWM method to implement single quadrant motor drive systems, despite the higher switching losses and increased high frequency components of current in the motor and in the DC source.

Accordingly, there are needs in the art for new methods and apparatus for driving polyphase motors, particularly where it is desirable to perform four quadrant operation, and also to enjoy lower switching losses, and reduced high frequency components of current in the motor and in the DC source.

SUMMARY OF THE INVENTION

In accordance with one or more aspects in the present invention, an apparatus includes a driver circuit including electronic switches operable to deliver voltage and current to a polyphase motor; and a control circuit operable to provide driver control signals to the driver circuit to commutate the electronic switches, the control circuit (i) producing the driver control signals using a first pulse width modulation (PWM) mode when the polyphase motor produces a substantially non-zero acceleration torque; and (ii) producing the driver control signals using a second PWM mode when the polyphase motor produces a substantially zero acceleration torque.

The polyphase motor may be a permanent magnet machine, a brushless DC machine, or an induction machine. By way of example, the first PWM mode is the chop-chop mode, and the second PWM mode may be the chop-coast mode.

The control circuit is preferably operable to monitor the magnitude of the acceleration torque of the polyphase motor by sensing current delivered from a DC source to the driver circuit in order to determine which PWM mode to use. For example, the control circuit may be operable to produce the driver control signals based on a speed command signal, which is indicative of a desired rotational speed for the polyphase motor; and the control circuit may be operable to sense a substantially non-zero acceleration torque of the polyphase motor when the speed command signal changes substantially. Additionally, or alternatively, the control circuit may be operable to sense a substantially non-zero acceleration torque of the polyphase motor when a load on the polyphase motor changes substantially.

Preferably, the control circuit is operable to produce the driver control signals using the first PWM mode when the acceleration torque has a substantially non-zero magnitude, and to produce the driver control signals using the second PWM mode when the acceleration torque has a substantially zero magnitude.

In this regard, the control circuit preferably includes a chop-chop PWM control circuit operable to produce a chop-chop PWM command signal in response to a speed command signal, which is indicative of a desired rotational speed for the polyphase motor, and a sensed speed signal indicative of a rotational speed of the polyphase motor. The chop-chop PWM command signal is preferably at a substantially steady state level when the polyphase motor produces a substantially zero acceleration torque. The chop-chop PWM command signal is preferably at pulse width modulated levels when the polyphase motor produces a substantially non-zero acceleration torque.

The control circuit preferably further includes: a commutation circuit operable to produce commutation signals based on the rotational position of the polyphase motor and indicative of which windings of the polyphase motor should be energized; and a mode selection circuit operable to modify the commutation signals based on the chop-chop PWM command signal only when the chop-chop PWM command signal is at pulse width modulated levels.

The mode selection circuit may include a first plurality of logic gates, each logic gate receiving at least a respective one of the commutation signals and the chop-chop PWM command signal as input. Respective outputs from the first plurality of logic gates are used as, or to derive, the driver control signals. Preferably, the first plurality of logic gates are operable to pass the commutation signals substantially unchanged when the chop-chop PWM command signal is at the substantially steady state value.

The control circuit may further include a chop-coast PWM control circuit operable to produce a chop-coast PWM command signal in response to the speed command signal and the sensed speed signal. The chop-coast PWM command signal is preferably at a substantially steady state level when the polyphase motor produces a substantially non-zero acceleration torque. The chop-coast PWM command signal is preferably at pulse width modulated levels when the polyphase motor produces a substantially zero acceleration torque. The speed command signal input to the chop-coast PWM control circuit may be increased in magnitude as compared to the speed command signal input to the chop-chop PWM control circuit such that the output of the chop-chop PWM control circuit saturates to the substantially steady state level when the polyphase motor produces a substantially zero acceleration torque. Alternatively, the sensed speed signal input to the chop-chop PWM control circuit may be decreased in magnitude as compared to the sensed speed signal input to the chop-coast PWM control circuit such that the output of the chop-chop PWM control circuit saturates to the substantially steady state level when the polyphase motor produces a substantially zero acceleration torque.

Preferably, the mode selection circuit is operable to modify at least some of the respective outputs of the first plurality of logic gates based on the chop-coast PWM command signal only when the chop-coast PWM command signal is at pulse width modulated levels.

The mode selection circuit may further include a second plurality of logic gates, each logic gate receiving at least a respective one of the at least some of the respective outputs of the first plurality of logic gates and the chop-coast PWM command signal as input. Respective outputs from the second plurality of logic gates are used as, or to derive, at least some of the driver control signals. Preferably, the second plurality of logic gates are operable to pass the at least some of the respective outputs of the first plurality of logic gates substantially unchanged when the chop-coast PWM command signal is at the substantially steady state value.

The driver circuit preferably includes respective pairs of high-side and low-side electronic switches, each pair being coupled in series across a direct current (DC) bus and having a respective intermediate node for coupling to a respective winding of the polyphase motor, and each electronic switch including an anti-parallel diode thereacross. In the first PWM mode, current flows from a high potential of the DC bus through one of the high-side electronic switches, through a pair of the windings of the polyphase motor, and through one of the low-side electronic switches to a low potential of the DC bus, during one portion of each switching cycle. During another portion of each switching cycle, current flows from the low potential of the DC bus through one of the anti-parallel diodes of one of the low-side electronic switches, through the pair of the windings of the polyphase motor, and through one of the anti-parallel diodes of one of the high-side-electronic switches to the high potential of the DC bus.

In the second PWM mode, current flows from a high potential of the DC bus through one of the high-side electronic switches, through a pair of the windings of the polyphase motor, and through one of the low-side electronic switches to a low potential of the DC bus, during one portion of each switching cycle. During another portion of each switching cycle, current continues to flow through the pair of the windings of the polyphase motor, through one of the anti-parallel diodes of one of the high-side electronic switches, and through the high-side electronic switch back to the pair of the windings of the polyphase motor.

In accordance with one or more further aspects of the present invention, a method includes: controlling a polyphase motor using a first pulse width modulation (PWM) mode when the polyphase motor produces a substantially non-zero acceleration torque; and controlling the polyphase motor using a second PWM mode when the polyphase motor produces a substantially zero acceleration torque. The first PWM mode may be the chop-chop mode, and the second PWM mode may be the chop-coast mode.

The method preferably further includes monitoring the magnitude of the acceleration torque of the polyphase motor by sensing current delivered from a DC source to the driver circuit. The method may also include controlling the polyphase motor based on a speed command signal, which is indicative of a desired rotational speed for the polyphase motor; and sensing a substantially non-zero acceleration torque of the polyphase motor when the speed command signal changes substantially. Alternatively, or in addition, the method may further include sensing a substantially non-zero acceleration torque of the polyphase motor when a load on the polyphase motor changes substantially.

The method controls the polyphase motor in accordance with the first PWM mode when the acceleration torque has a substantially non-zero magnitude. The method controls the polyphase motor in accordance with the second PWM mode when the acceleration torque has a substantially zero magnitude.

A chop-chop PWM command signal may be produced in response to a speed command signal, which is indicative of a desired rotational speed for the polyphase motor, and a sensed speed signal indicative of a rotational speed of the polyphase motor, wherein the chop-chop PWM command signal is at a substantially steady state level when the polyphase motor produces a substantially zero acceleration torque; and the chop-chop PWM command signal is at pulse width modulated levels when the polyphase motor produces a substantially non-zero acceleration torque.

The method may further include producing commutation signals based on the rotational position of the polyphase motor and indicative of which windings of the polyphase motor should be energized; and modifying the commutation signals based on the chop-chop PWM command signal only when the chop-chop PWM command signal is at pulse width modulated levels. Further, a chop-coast PWM command signal may be produced in response to the speed command signal and the sensed speed signal, wherein the chop-coast PWM command signal is at a substantially steady state level when the polyphase motor produces a substantially non-zero acceleration torque; and the chop-coast PWM command signal is at pulse width modulated levels when the polyphase motor produces a substantially zero acceleration torque.

Other aspects, features, and advantages of the invention will be apparent to one skilled in the art in view of the discussion herein taken in conjunction with the accompanying drawings.

BRIEF DESCRIPTION OF THE DRAWINGS

For the purposes of illustrating the invention, there are shown in the drawings forms that are presently preferred, it being understood, however, that the invention is not limited to the precise arrangements and instrumentalities shown.

DETAILED DESCRIPTION OF THE INVENTION

Figure 1:
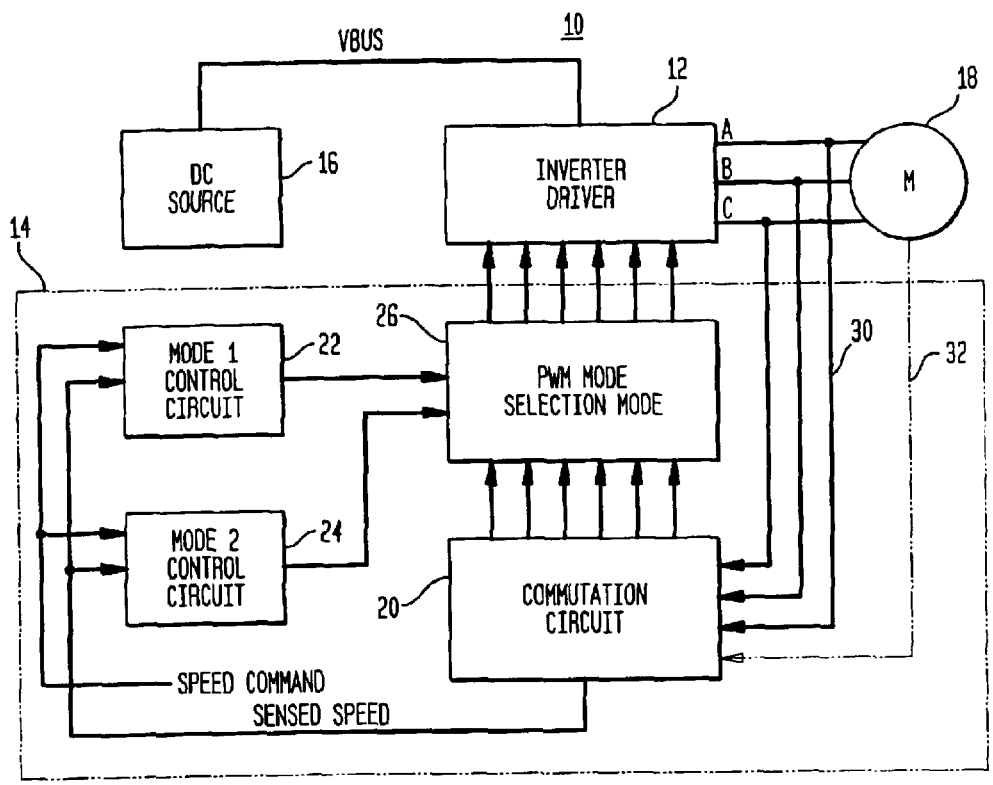
FIG. 1 is a conceptual block diagram illustrating an apparatus for driving a motor in accordance with one or more aspects of the present invention.

Referring now to the drawings, wherein like numerals indicate like elements, there is shown in FIG. 1 a block diagram of a motor driver apparatus 10 in accordance with one or more aspects of the present invention. For the purposes of brevity and clarity, the block diagram of FIG. 1 (and other block diagrams herein) will be referred to, and described herein, as illustrating an apparatus, it being understood, however, that the description may be readily applied to various aspects of one or more methods of the present invention with equal force.

Figure 2:
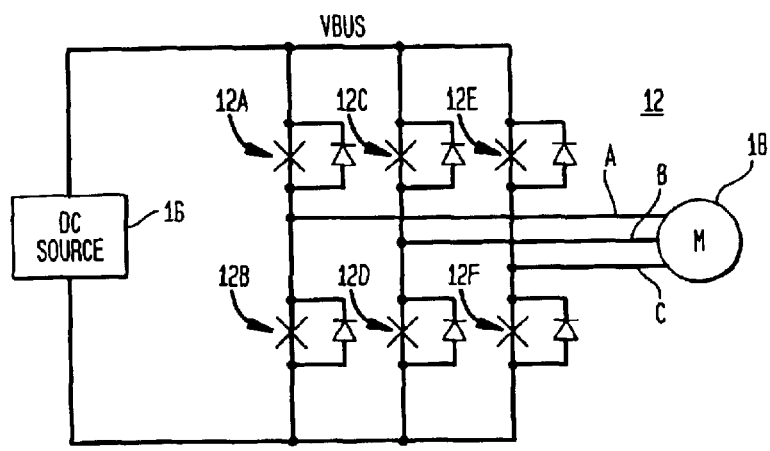
FIG. 2 is a schematic diagram illustrating certain details concerning an inverter driver circuit in accordance with one or more aspects of the present invention.

The motor driver 10 includes an inverter driver circuit 12 and a control circuit 14. The inverter driver circuit 12 is operable to receive DC voltage and current from a DC source 16 and produce AC voltage and current to a polyphase motor 18. The inverter driver circuit 12 may include a plurality of electronic switches that are operable to convert the DC voltage provided by the DC source 16 into AC voltage for delivery to the windings of the polyphase motor 18. By way of example, and as best seen in FIG. 2, the inverter driver circuit 12 may include respective pairs of high-side and low-side electronic switches 12A–12B, 12C–12D, and 12E–12F. Each electronic switch 12A–F preferably includes an anti-parallel diode thereacross. The respective pairs of switches 12A–12B, 12C–12D, and 12E–12F are coupled in series across a DC bus, VBUS, and coupled at respective intermediate nodes A, B, and C to the windings of the polyphase motor 18.

It is noted that the polyphase motor 18 may be a permanent magnet (PM) machine, such a polyphase AC motor, a brushless DC motor, etc., or an induction machine. The illustrative embodiments described herein were subject to experimentation and/or testing in conjunction with a brushless DC polyphase motor 18. It is understood, however, that skilled artisans can easily apply the details of these illustrative embodiments in connection with other types of machines.

The respective electronic switches 12A–F are turned on and off in accordance with driver control signals issuing from the control circuit 14. More particularly, the control circuit 14 is operable to provide the driver control signals to the inverter driver circuit 12 in order to commutate the electronic switches 12A–F in order to accommodate at least two modes of PWM control. For example, the control circuit 14 is operable to produce the driver control signals utilizing a first PWM mode when the polyphase motor 18 is either accelerating or decelerating. The control circuit 14 is also operable to produce the driver control signals utilizing a second PWM mode when the polyphase motor 18 is not accelerating, such as when the polyphase motor 18 is in steady state. By way of example, the first PWM mode is preferably the chop-chop mode and the second PWM mode is preferably the chop-coast mode.

Turning again to FIG. 1, the control circuit 14 preferably includes a commutation circuit 20, a mode 1 control circuit 22, a mode 2 control circuit 24, and a PWM mode selection circuit 26. The commutation circuit 20 is preferably operable to receive information concerning the rotor position of the polyphase motor 18 and produce respective commutation signals to the PWM mode selection circuit 26. The commutation signals are indicative of which windings of the polyphase motor 18 should be energized as a function of the rotor position of the polyphase motor 18. By way of example, the commutation circuit 20 may produce commutation signals in accordance with any of the known six-step commutation schemes.

The commutation circuit 20 may receive information concerning the rotor position of the polyphase motor 18 by way of sensorless techniques or utilizing rotor position sensing equipment. When sensorless techniques are employed, the commutation circuit 20 preferably receives winding signals by way of lines 30. Any of the known techniques for monitoring such signals may be employed, for example, monitoring BEMF voltages, monitoring current levels in the windings, etc. Alternatively, rotor position information may be received over line 32 when rotor position sensor(s) are employed. The commutation circuit 20 may also measure the rotational speed of the polyphase motor 18 by way of the signaling that it receives over lines 30 or 32. The commutation circuit 20 preferably issues a signal indicative of the sensed rotational speed of the polyphase motor 18 to the mode 1 and mode 2 control circuits 22, 24.

The mode 1 and mode 2 control circuits 22, 24 preferably receive the sensed speed signal from the commutation circuit 20 and a speed command signal (which may be an external command) and operate to produce respective PWM command signals that are input to the PWM mode selection circuit 26. The PWM mode selection circuit 26 is preferably operable to modify the commutation signals received from the commutation circuit 20 based on the respective PWM command signals received from the mode 1 and mode 2 control circuits 22, 24. For example, when the polyphase motor 18 is accelerating or decelerating, the PWM mode selection circuit 26 is preferably operable to modify the commutation signals produced by the commutation circuit 20 by the PWM command signal issuing from the mode 1 control circuit 22 in order to produce the driver control signals delivered to the inverter driver circuit 12. In this way, the polyphase motor 18 is preferably driven and controlled in accordance with the first PWM mode. In contrast, when the polyphase motor 18 is not accelerating or decelerating, such as in steady state, the PWM mode selection circuit 26 is preferably operable to modify the commutation signals issuing from the commutation circuit 20 in accordance with the PWM command signal issuing from the mode 2 control circuit 24. In this way, the polyphase motor 18 is driven and controlled in accordance with the second PWM mode.

Figure 3:
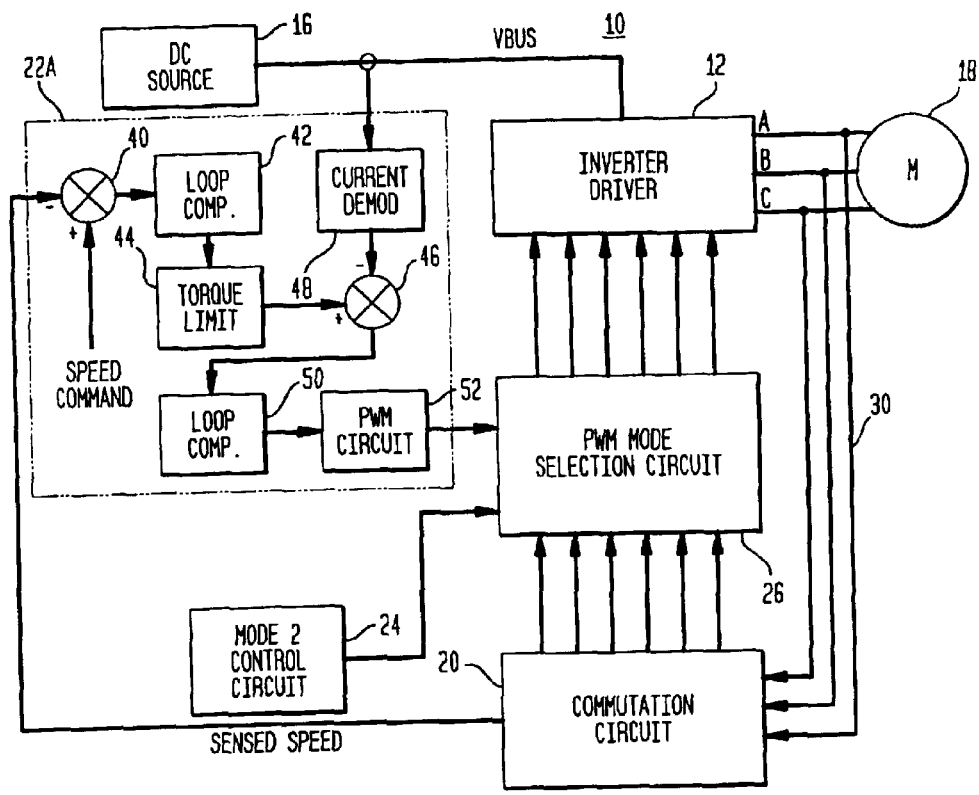
FIG. 3 is block diagram of the apparatus of FIG. 1, which provides further details concerning some of the control circuitry thereof.

With reference to FIG. 3, the mode 1 control circuit 22A is preferably implemented utilizing a chop-chop PWM control circuit. The chop-chop PWM control circuit 22A preferably includes a first error amplifier 40, a loop compensation circuit 42, a torque limit circuit 44, a second error amplifier 46, a current demodulator circuit 48, a second loop compensation circuit 50, and a PWM circuit 52. The first error amplifier 40 preferably receives the speed command signal and the sensed speed signal from the commutation circuit 20 and takes the difference thereof to produce an error voltage. The error voltage is input to the first loop compensation circuit 42, which is utilized to compensate the speed loop. Any of the known circuit techniques may be utilized to implement the first error amplifier 40 and the first loop compensation circuit 42.

The torque limit circuit 44 is employed to establish a lower limit and an upper limit for adjustments in the torque command. The torque signal issuing from the torque limit circuit 44 is input into the second error amplifier 46. The second error amplifier 46 also receives a signal indicative of the actual torque of the polyphase motor 18. This sensed torque signal is obtained by measuring the current drawn from the DC source 16, which is the function of the current demodulator circuit 48. A difference of the torque signal issuing from the torque limit circuit 44 and the measured torque signal issuing from the current demodulator circuit 48 is taken by the second error amplifier 46 in order to produce an error signal. The error signal is input into the second loop compensation circuit 50, which is utilized to compensate the torque loop. The compensated error voltage is input into the chop-chop PWM circuit 52, which produces a varying duty cycle signal as a function of the compensated error voltage. The chop-chop PWM circuit 52 produces the chop-chop PWM control signal, which is input into the PWM mode selection circuit 26.

As discussed above, the PWM mode selection circuit 26 preferably outputs driver control signals to the inverter driver circuit 12 in accordance with the chop-chop PWM mode when the polyphase motor 18 is either accelerating or decelerating. When in steady state, however, the PWM mode selection circuit 26 preferably outputs driver control signals in accordance with the second PWM mode, by way of the mode 2 control circuit 24. The details concerning the mode selection process will be discussed in more detail hereinbelow.

Figure 4:
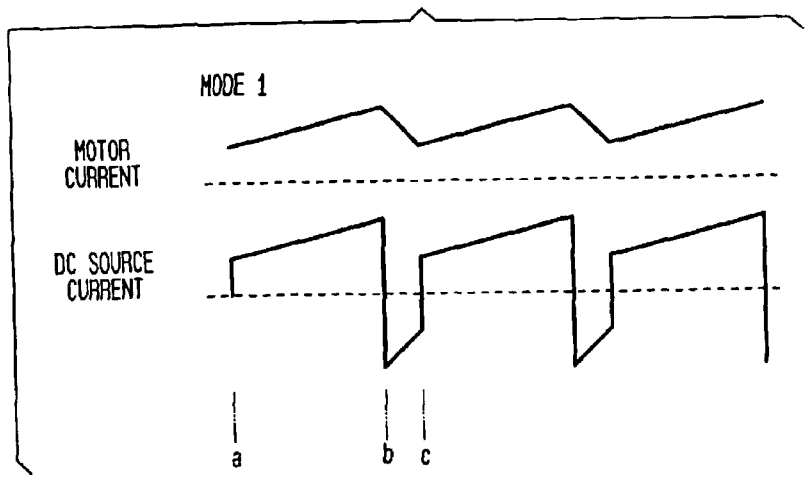
FIG. 4 illustrates a graph of the motor current and the DC source current in accordance with one mode of operating the apparatus of FIG. 1.

With reference to FIGS. 2 and 4, additional details concerning the operating of the apparatus 10 will now be provided when it is operating in the chop-chop PWM mode.

In particular, the PWM mode selection circuit 26 outputs the driver control signals to commutate the electronic switches 12A–F in the following way. Current flows from the DC source 16 through one of the high-side electronic switches, such as switch 12A, and through a pair of the windings of the polyphase motor 18, such as into the winding of node A and out of the winding of node B (assuming that the windings of the polyphase motor 18 are in a Y configuration). The current then flows through one of the low-side electronic switches, such as switch 12D to a low potential of the DC source 16. The resultant motor current and DC source current are illustrated in FIG. 4. In particular, from time t=a to b, current ramps up in the respective pair of windings of the polyphase motor 18, where the current ramp rate is proportional to the magnitude of the voltage of the DC source 16 minus the BEMF of the polyphase motor 18 divided by the inductance of the combined pair of windings of the polyphase motor 18. When the chop-chop PWM circuit 52 (FIG. 3) indicates that an upper limit of the motor current has been reached, then the electronic switches 12A and 12D are turned off.

As the current must continue to flow through the respective pair of windings of the polyphase motor 18, current is drawn from the low potential of the DC source 16 through the anti-parallel diode of the low-side electronic switch 12D and into node A. Current flows out of node B and through the anti-parallel diode of the high-side electronic switch 12C to the high potential of the DC source 16. As shown in FIG. 4, the ramp down of the motor current from time t=b to c is fairly rapid owing to the aggregate voltage of the DC source and the BEMF of the polyphase motor 18 driving the di/dt. Since the current of the DC source 16 reverses during this interval of time, the current of the DC source 16 in FIG. 14 is negative. This process is repeated for various pairs of windings of the polyphase motor 18 in order to produce the desired torque and speed of the polyphase motor 18.

Figure 5:
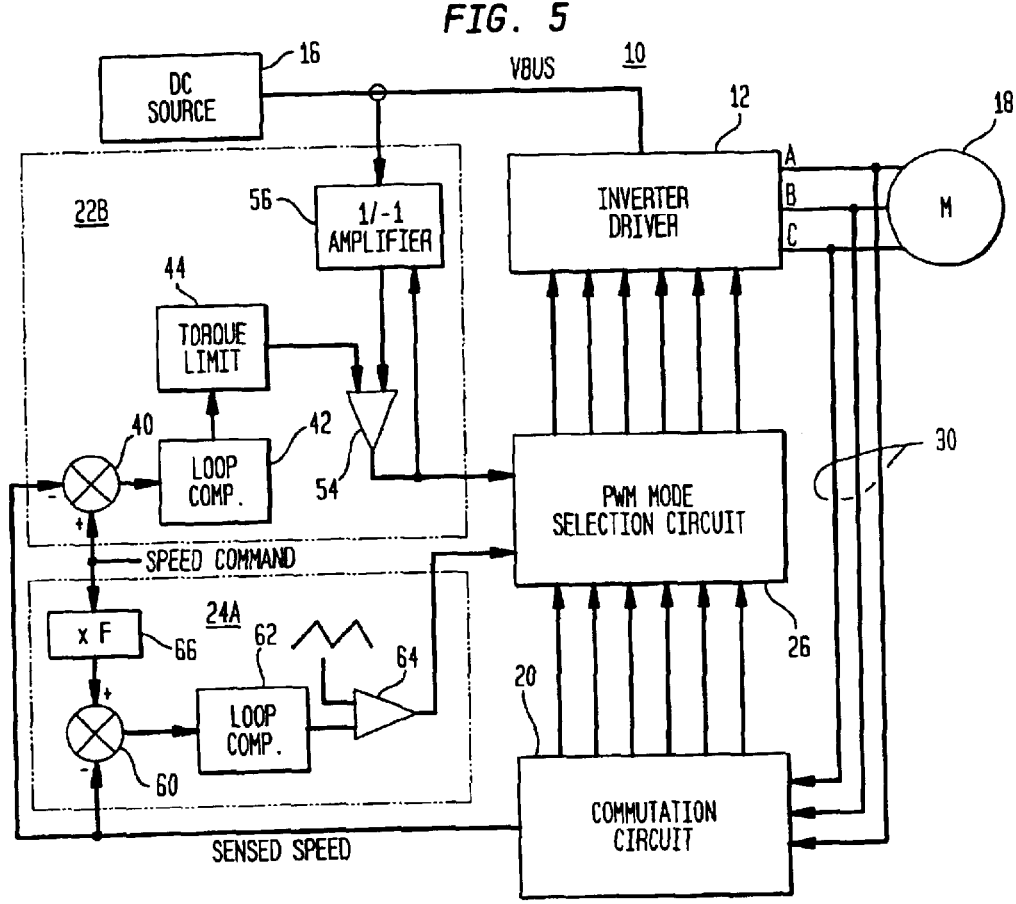
FIG. 5 is a block diagram of the apparatus of FIG. 1, which provides further details concerning other control circuitry in accordance with one or more aspects of the present invention.

Reference is now made to FIG. 5, which is block diagram illustrating an alternative circuit implementation for the mode 1 control circuit 22B, and provides details concerning a suitable implementation of the mode 2 control circuit 24A. The chop-chop PWM control circuit 22B of FIG. 5 employs a hysteretic current mode controller in order to produce the chop-chop PWM command signal input to the PWM mode selection circuit 26. This controller replaces the second error amplifier 46, the current demodulator circuit 48, the loop compensation circuit 50, and the chop-chop PWM circuit 52 of FIG. 3 with a hysteretic comparator 54 and a 1/–1 amplifier 56. The output of the hysteretic comparator 54 is the chop-chop PWM command signal.

The mode 2 control circuit 24 is preferably implemented utilizing a chop-coast PWM control circuit 24A. The chop-coast PWM control circuit 24A preferably includes an error amplifier 60, a loop compensation circuit 62, and a PWM comparator 64. The error amplifier 60 compares a signal indicative of the sensed speed signal with the speed command signal in order to produce an error voltage. The error voltage is input into the loop compensation circuit 62 in order to compensate for the speed loop. The output of the loop compensation circuit 62 is input into the PWM comparator 64, which also receives a fixed frequency triangle wave in order to produce the chop-coast PWM command signal for input into the PWM mode selection circuit 26. The chop-coast PWM control circuit 24A also includes a multiplier 66, which will be discussed in more detail hereinbelow.

As discussed above, the PWM mode selection circuit 26 preferably outputs the driver control signals to the inverter driver circuit 12 in accordance with the chop-coast PWM mode when the polyphase motor 18 is not accelerating or decelerating, e.g., the polyphase motor 18 is in steady state. Under these circumstances, the PWM mode selection circuit 26 preferably outputs the driver control signals to the inverter driver circuit 12 in accordance with the chop-coast PWM mode (by way of the chop-coast PWM control circuit 24A).

Figure 6:
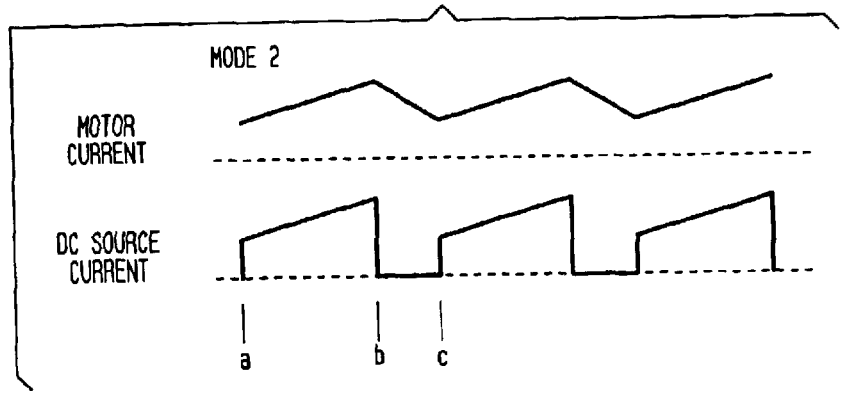
FIG. 6 illustrates graphs of the motor current and the DC source current in accordance with another mode of operation.

With reference to FIGS. 2 and 6, the chop-coast PWM mode control causes the motor current and DC source current characteristics illustrated in FIG. 6. In particular, the PWM mode selection circuit 26 outputs the driver control signals to commutate the electronic switches 12A–F in the following way. Current flows from the DC source 16 through one of the high-side electronic switches, such as switch 12A, and through a pair of the windings of the polyphase motor 18, such as into the winding of node A and out of the winding of node B (assuming that the windings of the polyphase motor 18 are in a Y configuration). The current then flows through one of the low-side electronic switches, such as switch 12D to a low potential of the DC source 16. The resultant motor current and DC source current are illustrated in FIG. 6. In particular, from time t=a to b, current ramps up in the respective pair of windings of the polyphase motor 18, where the current ramp rate is proportional to the magnitude of the voltage of the DC source 16 minus the BEMF of the polyphase motor 18 divided by the inductance of the pair of windings.

When the chop-coast PWM control circuit 24A determines that the electronic switches of the inverter driver circuit 12 should be commutated, the high-side electronic switch 12A remains on, but the low-side electronic switch 12D is turned off. As the current must continue to flow through the respective pair of windings of the polyphase motor 18, the current flows out of node B and through the anti-parallel diode of the high-side electronic switch 12C. Instead of returning to the DC source 16 (as in the chop-chop mode), the current then flows through the high-side electronic switch 12A and back into node A. Thus, during the time period of t=b to c, the motor current ramps down at a rate that is proportional to the BEMF of the polyphase motor 18 divided by the inductance of the respective pair of windings thereof. (Note that the rate at which the current ramps down in the chop-coast mode is not as steep as in the chop-chop mode.) As no current is either drawn or returned to the DC source 16, the illustrated DC source current in FIG. 6 is 0.

It is noted that the chop-coast PWM mode may also be implemented by the chop-coast PWM control circuit 24A and the PWM mode selection circuit 26 by keeping the low-side electronic switch 12D on and turning the high-side electronic switch 12A off. Of course, this will cause currents to flow in different paths than discussed above; however, the characteristics shown in FIG. 6 will remain the same.

Figure 7:
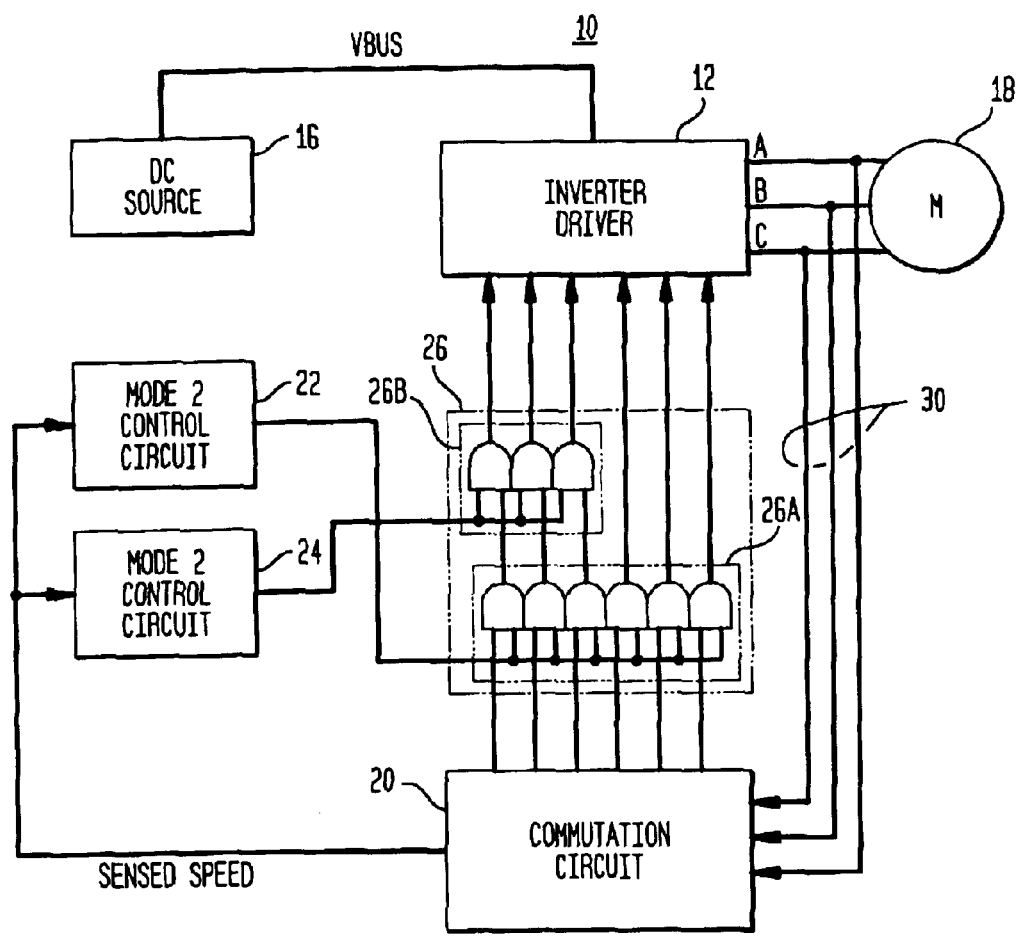
FIG. 7 is a block diagram of the apparatus of FIG. 1, which provides further details concerning a mode selection circuit in accordance with one or more further aspects of the present invention.

Reference is now made to FIG. 7, which is block diagram of the motor driver apparatus 10 that provides further details concerning the PWM mode selection circuit 26. Preferably, the PWM mode selection circuit 26 includes a first plurality of logic gates 26A, where each logic gate receives a respective one of the commutation signals issuing from the commutation circuit 20. Each of the logic gates also preferably receives the PWM command signal issuing from the mode 1 control circuit 22. By way of example, the mode 1 control circuit 22 may be a chop-chop PWM control circuit, such as the chop-chop PWM control circuit 22B of FIG. 5. The outputs of the lower three logic gates are input to the inverter driver circuit 12, such as to the low-side electronic switches 12B, 12D, and 12F (FIG. 2).

The PWM mode selection circuit 26 also preferably includes a second set of logic gates 26B. Each of the logic gates of the second set 26B preferably receives the outputs of the three remaining logic gates of the first set 26A. The second set of logic gates 26B also preferably receive the PWM command signal issuing from the mode 2 control circuit 24. The mode 2 control circuit 24 may be implemented utilizing a chop-coast PWM control circuit, such as the control circuit 24A of FIG. 5. The outputs of the second set of logic gates 26B are input to inverter driver circuit 12, such as to the high-side electronic switches 12A, 12C, and 12E (FIG. 2).

Preferably, the mode 1 control circuit 22 is operable to produce its PWM command signal (such as a chop-chop PWM command signal) such that it is at a substantially steady state level when the polyphase motor 18 is neither accelerating nor decelerating, e.g., the polyphase motor 18 is in a steady state. Conversely, the mode 1 control circuit 22 preferably produces a PWM command signal that is pulse width modulated when the polyphase motor 18 is either accelerating or decelerating. Similarly, the mode 2 control circuit 24 (which may be implemented utilizing the chop-coast PWM control circuit 24A of FIG. 5), is preferably operable to produce a PWM command signal that is at a substantially steady state level when the polyphase motor 18 is either accelerating or decelerating. Conversely, the mode 2 control circuit 24 preferably produces a PWM command signal that is pulse width modulated when the polyphase motor 18 is neither accelerating nor decelerating, e.g., the polyphase motor 18 is at a substantially steady state condition.

With reference to FIG. 5, the chop-coast PWM control circuit 24A boosts the speed command signal by a factor of F utilizing the multiplier 66. For purposes of discussion, the multiplier 66 may increase the magnitude of the speed command signal by about 1 percent, although any value is contemplated in accordance with the present invention. The chop-chop PWM control circuit 22B, however, does not alter the speed command signal. Thus, assuming that the polyphase motor 18 is in steady state, the output of the hysteretic comparator 54 will be saturated (preferably at a high level), while the PWM comparator 64 of the chop-coast PWM control circuit 24A will produce a chop-coast PWM command signal that is pulse width modulated.

It is noted that an alternative configuration may employ a reducing circuit, such as resistor divider, to reduce the magnitude of the sensed speed signal input into the chop-chop PWM control circuit 22B instead of the multiplier circuit 66.

Turning to FIG. 7, the chop-chop PWM command signal issuing from the mode 1 control circuit 22 (which is saturated) preferably places a logic high level on the inputs to all of the logic gates 26A. Assuming that the logic gates 26A are AND gates, then the logic gates 26A will pass the commutation signals issuing from the commutation circuit 20 substantially unchanged. The second plurality of logic gates 26B will receive three of the commutation signals issuing from the commutation circuit 20 (and passing through the first plurality of logic gates 26A) and will also receive a chop-coast PWM signal that is pulse width modulated. Thus, the high-side electronic switches 12A, 12C and 12E (FIG. 2) will receive driver control signals in accord with the chop-coast PWM mode, thereby turning those switches on and off to achieve the motor current illustrated in FIG. 6.

Alternatively, when the polyphase motor 18 is accelerating or decelerating, either due to an increase or decrease in the speed command signal, or due to an increase or decrease on the load on the polyphase motor 18, the PWM command signal issuing from the chop-coast control circuit 24A will saturate while the PWM control signal issuing from the chop-coast control circuit 22B will be pulse width modulated. Indeed, assuming that the speed command signal is suddenly increased, the sensed speed signal will not immediately increase and the output from the PWM comparator 64 of the chop-coast PWM control circuit 24A will tend to saturate. This characteristic may be enhanced by designing the bandwidth of the chop-coast PWM control circuit 24A to be substantially slower than the bandwidth of the chop-chop PWM control circuit 22B. The sudden increase in the speed command signal and the attendant increase in the current drawn from the DC source 16 will bring the hysteretic comparator 54 of the chop-chop control circuits 22B out of saturation and into pulse width modulation. Thus, the first plurality of logic gates 26A will modify the commutation signals issuing from the commutation circuit 20 in accordance with the chop-chop PWM command signal issuing from the mode 1 control circuit 22B. Conversely, the second plurality of logic gates 26B will pass the signals received from the first plurality of logic gates 26A vis-à-vis the saturated level of the PWM control signal issuing from the mode 2 control circuit 24.

Once the polyphase motor 18 again achieves a steady state, such as reaching the new rotational speed and/or once the load on the polyphase motor 18 has settled out, the mode 2 control circuit 24 will again dominate until such time as the polyphase motor 18 exhibits acceleration or deceleration torques.

Figure 8A:
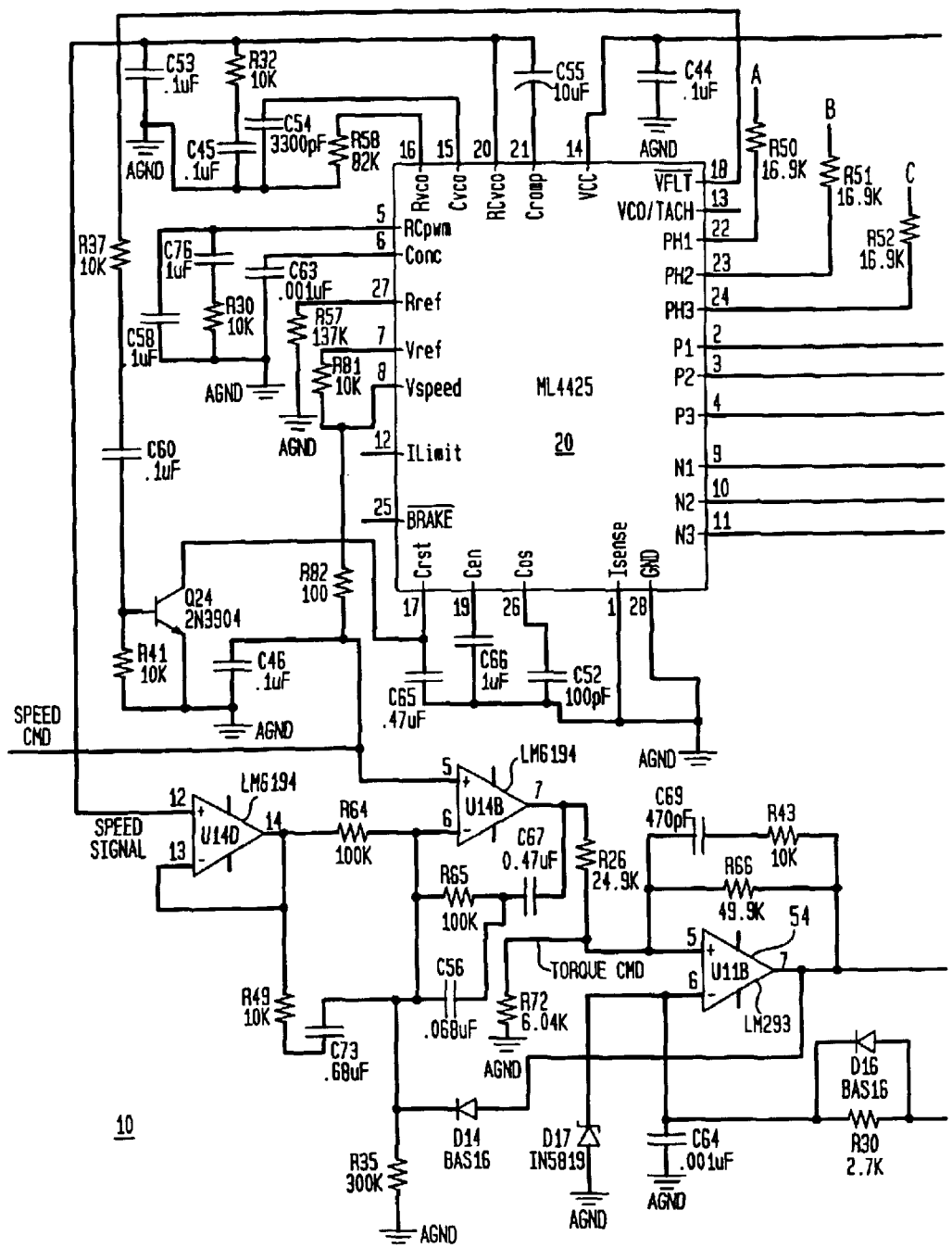
FIGS. 8A–8B are detailed schematic diagrams of circuitry that is suitable for implementing the apparatus of FIG. 1.
Figure 8B:
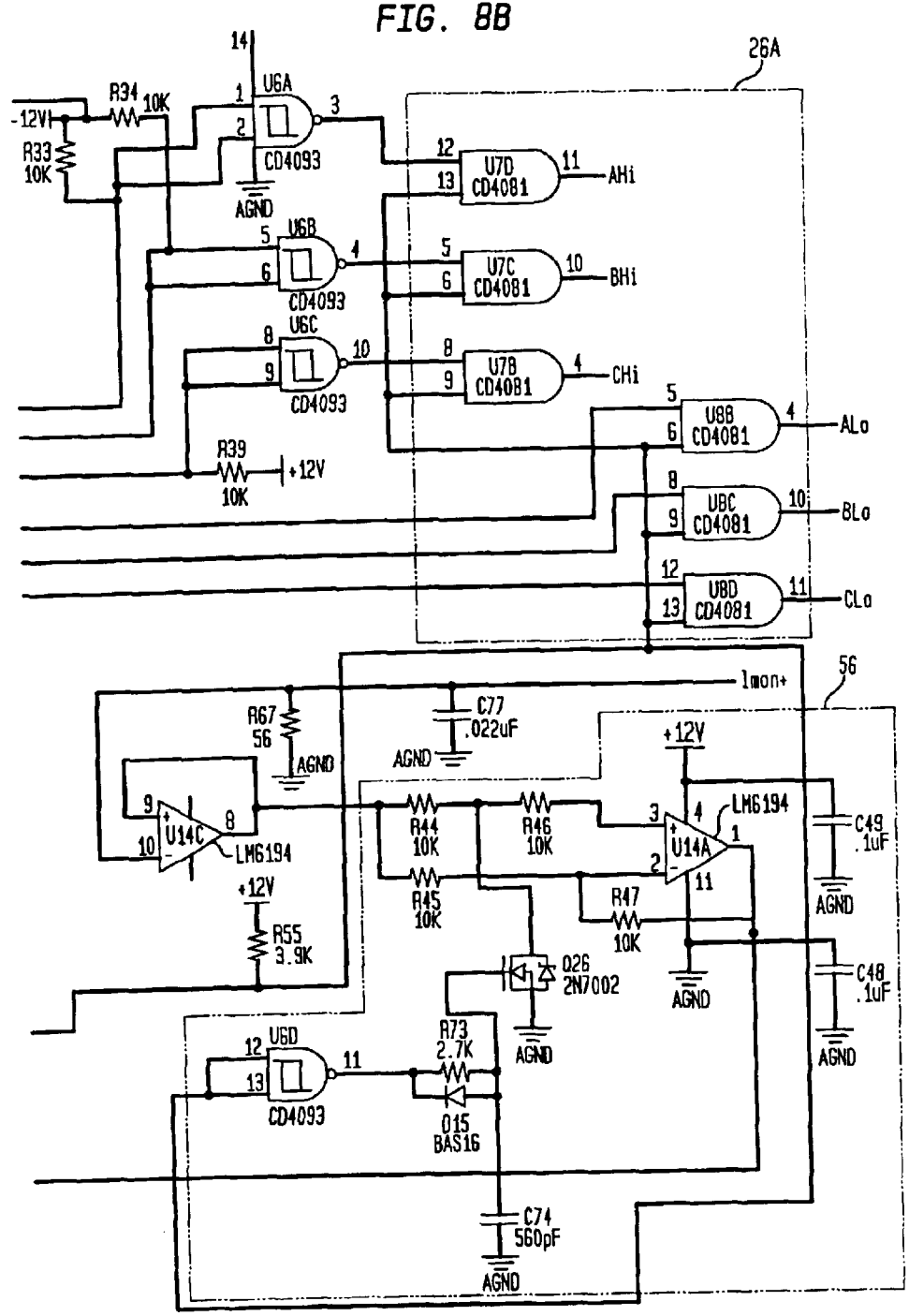

Reference is now made to FIGS. 8A–8B, which are detailed schematic diagrams illustrating one example of a suitable circuit implementation for the motor driver apparatus 10. For the purpose of brevity and clarity, a detailed description of all of the features of the circuits of FIGS. 8A–8B will be omitted inasmuch as such will be apparent to one of ordinary skill in the art in view of the description hereinabove. A prototype of the circuit of FIGS. 8A–8B has been produced and certain test data is shown in FIGS. 9 and 10.

Figure 9:
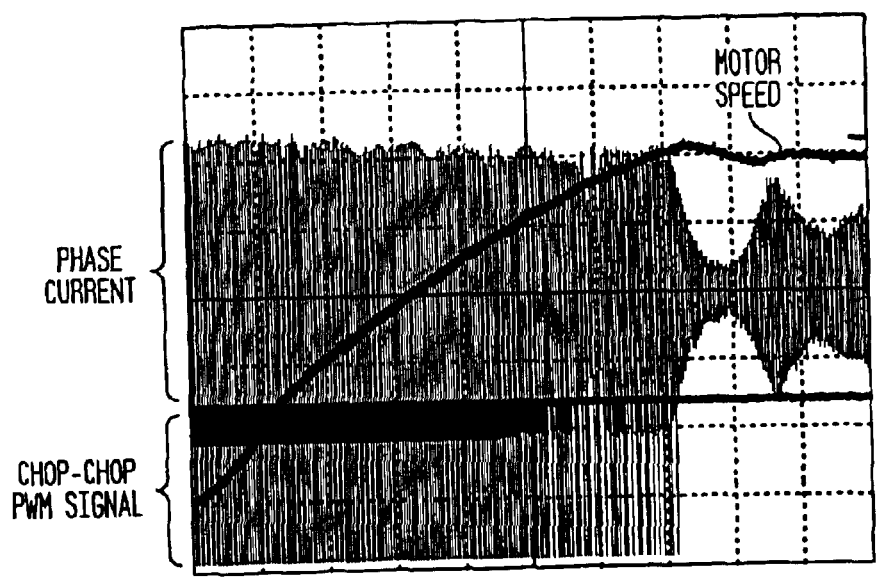
FIG. 9 is a graph illustrating certain characteristics of the circuit of FIG. 8.

In particular, FIG. 9 shows the chop-chop PWM command signal issuing from the mode 1 control circuit 22 (FIG. 1), the current in one phase of the polyphase motor 18, and the motor speed. As the polyphase motor 18 accelerates (and the motor speed increases), the chop-chop PWM command signal is at pulse width modulation levels. When the commanded speed is reached, however, the chop-chop PWM control signal saturates and the mode 2 control circuit 24 takes over. Advantageously, the high frequency current components in the illustrated phase of the polyphase motor 18 substantially reduces owing to one of the advantages of the chop-coast PWM technique.

Figure 10:
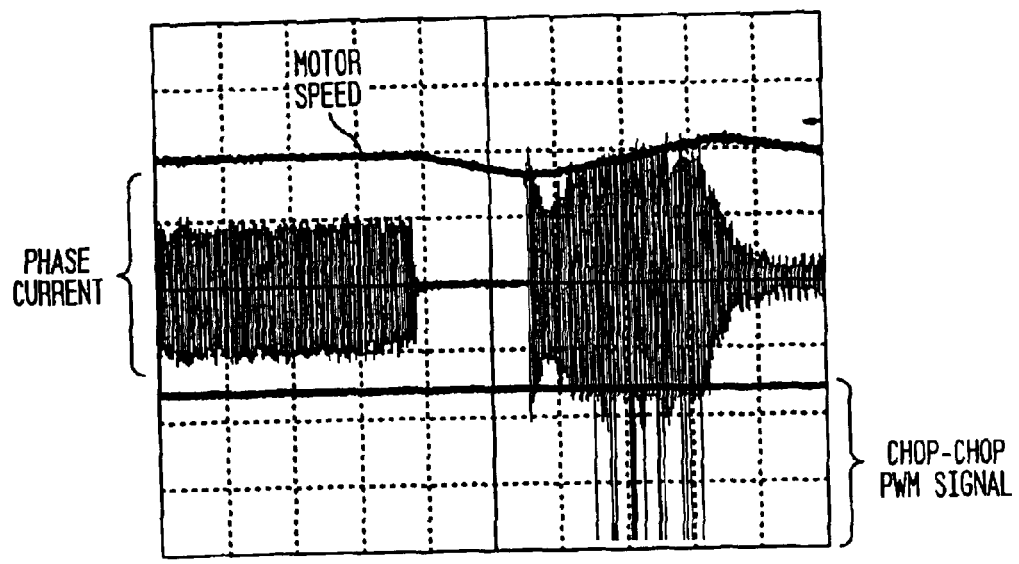
FIG. 10 is a graph illustrating certain other characteristics of the circuit of FIG. 8.

FIG. 10 illustrates a momentary loss in the DC voltage supplied to the system from the DC source 16. In particular, the left-hand side of the figure shows that the chop-chop PWM control signal is saturated, thereby indicating that the chop-coast PWM control circuit 24A is controlling the polyphase motor 18. Both the motor speed and the motor current are substantially steady. When the power is lost, the current in the motor falls to 0 and the motor speed rolls off. When the power is recovered, the motor speed accelerates and the chop-chop PWM control signal is at PWM levels until the motor speed again reaches the set point.

Advantageously, the methods and apparatus of the present invention take advantage of the positive aspects of two PWM modes of controlling a polyphase motor, such as the chop-chop PWM mode and the chop-coast PWM mode. In particular, the robust advantages of the chop-chop PWM mode may be enjoyed when the polyphase motor 18 accelerates or decelerates, while the reduced motor current switching losses and reduced high frequency motor current components are enjoyed when the polyphase motor is in steady state.

Although the invention herein has been described with reference to particular embodiments, it is to be understood that these embodiments are merely illustrative of the principles and applications of the present invention. It is therefore to be understood that numerous modifications may be made to the illustrative embodiments and that other arrangements may be devised without departing from the spirit and scope of the present invention as defined by the appended claims.

What is claimed is:

1. An apparatus, comprising:
    a driver circuit including electronic switches operable to deliver voltage and current to a polyphase motor; and
    a control circuit operable to provide driver control signals to the driver circuit to commutate the electronic switches, the control circuit (i) producing the driver control signals using a first pulse width modulation (PWM) mode when the polyphase motor produces a substantially non-zero acceleration torque; and (ii) producing the driver control signals using a second PWM mode when the polyphase motor produces a substantially zero acceleration torque.

2. The apparatus of claim 1, wherein the polyphase motor is taken from the group consisting of a permanent magnet machine, a brushless DC machine, and an induction machine.

3. The apparatus of claim 1, wherein the first PWM mode is the chop-chop mode.

4. The apparatus of claim 1, wherein the second PWM mode is the chop-coast mode.

5. The apparatus of claim 1, wherein the control circuit is operable to monitor the magnitude of the acceleration torque of the polyphase motor by sensing current delivered from a DC source to the driver circuit.

6. The apparatus of claim 5, wherein:
    the control circuit is operable to produce the driver control signals based on a speed command signal, which is indicative of a desired rotational speed for the polyphase motor; and
    the control circuit is operable to sense a substantially non-zero acceleration torque of the polyphase motor when the speed command signal changes substantially.

7. The apparatus of claim 5, wherein the control circuit is operable to sense a substantially non-zero acceleration torque of the polyphase motor when a load on the polyphase motor changes substantially.

8. The apparatus of claim 5, wherein the control circuit is operable to produce the driver control signals using the first PWM mode when the acceleration torque has a substantially non-zero magnitude.

9. The apparatus of claim 5, wherein the control circuit is operable to produce the driver control signals using the second PWM mode when the acceleration torque has a substantially zero magnitude.

10. The apparatus of claim 1, wherein:
    the control circuit includes a chop-chop PWM control circuit operable to produce a chop-chop PWM command signal in response to a speed command signal, which is indicative of a desired rotational speed for the polyphase motor, and a sensed speed signal indicative of a rotational speed of the polyphase motor;

the chop-chop PWM command signal is at a substantially steady state level when the polyphase motor produces a substantially zero acceleration torque; and the chop-chop PWM command signal is at pulse width modulated levels when the polyphase motor produces a substantially non-zero acceleration torque.

11. The apparatus of claim 10, wherein the control circuit includes:

a commutation circuit operable to produce commutation signals based on the rotational position of the polyphase motor and indicative of which windings of the polyphase motor should be energized; and a mode selection circuit operable to modify the commutation signals based on the chop-chop PWM command signal only when the chop-chop PWM command signal is at pulse width modulated levels.

12. The apparatus of claim 11, wherein:

the mode selection circuit includes a first plurality of logic gates, each logic gate receiving at least a respective one of the commutation signals and the chop-chop PWM command signal as input; and respective outputs from the first plurality of logic gates are used as, or to derive, the driver control signals.

13. The apparatus of claim 12, wherein the first plurality of logic gates are operable to pass the commutation signals substantially unchanged when the chop-chop PWM command signal is at the substantially steady state value.

14. The apparatus of claim 12, wherein:

the control circuit includes a chop-coast PWM control circuit operable to produce a chop-coast PWM command signal in response to the speed command signal and the sensed speed signal;

the chop-coast PWM command signal is at a substantially steady state level when the polyphase motor produces a substantially non-zero acceleration torque; and the chop-coast PWM command signal is at pulse width modulated levels when the polyphase motor produces a substantially zero acceleration torque.

15. The apparatus of claim 14, wherein the speed command signal input to the chop-coast PWM control circuit is increased in magnitude as compared to the speed command signal input to the chop-chop PWM control circuit such that the output of the chop-chop PWM control circuit saturates to the substantially steady state level when the polyphase motor produces a substantially zero acceleration torque.

16. The apparatus of claim 14, wherein the sensed speed signal input to the chop-chop PWM control circuit is decreased in magnitude as compared to the sensed speed signal input to the chop-coast PWM control circuit such that the output of the chop-chop PWM control circuit saturates to the substantially steady state level when the polyphase motor produces a substantially zero acceleration torque.

17. The apparatus of claim 14, wherein the mode selection circuit is operable to modify at least some of the respective outputs of the first plurality of logic gates based on the chop-coast PWM command signal only when the chop-coast PWM command signal is at pulse width modulated levels.

18. The apparatus of claim 17, wherein:

the mode selection circuit includes a second plurality of logic gates, each logic gate receiving at least a respective one of the at least some of the respective outputs of the first plurality of logic gates and the chop-coast PWM command signal as input; and respective outputs from the second plurality of logic gates are used as, or to derive, at least some of the driver control signals.

19. The apparatus of claim 18, wherein the second plurality of logic gates are operable to pass the at least some of the respective outputs of the first plurality of logic gates substantially unchanged when the chop-coast PWM command signal is at the substantially steady state value.

20. The apparatus of claim 1, wherein the driver circuit includes respective pairs of high-side and low-side electronic switches, each pair being coupled in series across a direct current (DC) bus and having a respective intermediate node for coupling to a respective winding of the polyphase motor, and each electronic switch including an anti-parallel diode thereacross.

21. The apparatus of claim 20, wherein the control circuit, in the first PWM mode, is operable to provide the driver control signals to commutate the electronic switches such that:

current flows from a high potential of the DC bus through one of the high-side electronic switches, through a pair of the windings of the polyphase motor, and through one of the low-side electronic switches to a low potential of the DC bus, during one portion of each switching cycle; and current flows from the low potential of the DC bus through one of the anti-parallel diodes of one of the low-side electronic switches, through the pair of the windings of the polyphase motor, and through one of the anti-parallel diodes of one of the high-side-electronic switches to the high potential of the DC bus, during another portion of each switching cycle.

22. The apparatus of claim 20, wherein the control circuit, in the second PWM mode, is operable to provide the driver control signals to commutate the electronic switches such that:

current flows from a high potential of the DC bus through one of the high-side electronic switches, through a pair of the windings of the polyphase motor, and through one of the low-side electronic switches to a low potential of the DC bus, during one portion of each switching cycle; and current continues to flow through the pair of the windings of the polyphase motor, through one of the anti-parallel diodes of one of the high-side electronic switches, and through the high-side electronic switch back to the pair of the windings of the polyphase motor during another portion of each switching cycle.

23. A method, comprising:

controlling a polyphase motor using a first pulse width modulation (PWM) mode when the polyphase motor produces a substantially non-zero acceleration torque; and controlling the polyphase motor using a second PWM mode when the polyphase motor produces a substantially zero acceleration torque.

24. The method of claim 23, wherein the polyphase motor is taken from the group consisting of a permanent magnet machine, a brushless DC machine, and an induction machine.

25. The method of claim 23, wherein the first PWM mode is the chop-chop mode.

26. The method of claim 23, wherein the second PWM mode is the chop-coast mode.

27. The method of claim 23, further comprising monitoring the magnitude of the acceleration torque of the polyphase motor by sensing current delivered from a DC source to the driver circuit.

28. The method of claim 27, further comprising:
controlling the polyphase motor based on a speed command signal, which is indicative of a desired rotational speed for the polyphase motor; and
sensing a substantially non-zero acceleration torque of the polyphase motor when the speed command signal changes substantially.

29. The method of claim 27, further comprising sensing a substantially non-zero acceleration torque of the polyphase motor when a load on the polyphase motor changes substantially.

30. The method of claim 27, further comprising controlling the polyphase motor in accordance with the first PWM mode when the acceleration torque has a substantially non-zero magnitude.

31. The method of claim 27, further comprising controlling the polyphase motor in accordance with the second PWM mode when the acceleration torque has a substantially zero magnitude.

32. The method of claim 27, further comprising producing a chop-chop PWM command signal in response to a speed command signal, which is indicative of a desired rotational speed for the polyphase motor, and a sensed speed signal indicative of a rotational speed of the polyphase motor, wherein the chop-chop PWM command signal is at a substantially steady state level when the polyphase motor produces a substantially zero acceleration torque; and the chop-chop PWM command signal is at pulse width modulated levels when the polyphase motor produces a substantially non-zero acceleration torque.

33. The method of claim 32, further comprising:
producing commutation signals based on the rotational position of the polyphase motor and indicative of which windings of the polyphase motor should be energized; and
modifying the commutation signals based on the chop-chop PWM command signal only when the chop-chop PWM command signal is at pulse width modulated levels.

34. The method of claim 32, further comprising producing a chop-coast PWM command signal in response to the speed command signal and the sensed speed signal, wherein the chop-coast PWM command signal is at a substantially steady state level when the polyphase motor produces a substantially non-zero acceleration torque; and the chop-coast PWM command signal is at pulse width modulated levels when the polyphase motor produces a substantially zero acceleration torque.

* * * * *